Feb. 11, 1969 N. R. WELSH 3,427,535

SWEEP GENERATOR HAVING AUTOMATICALLY CONTROLLED CENTER FREQUENCY

Filed Feb. 19, 1968 Sheet 1 of 9

INVENTOR.
NEIL R. WELSH

BY
FOWLER, KNOBBE & MARTENS
ATTORNEYS.

INVENTOR.
NEIL R. WELSH
BY
FOWLER, KNOBBE
& MARTENS
ATTORNEYS.

INVENTOR
NEIL R. WELSH
BY
FOWLER, KNOBBE & MARTENS
ATTORNEYS.

INVENTOR.
NEIL R. WELSH
BY
FOWLER, KNOBBE & MARTENS
ATTORNEYS.

INVENTOR
NEIL R. WELSH

BY
FOWLER, KNOBBE & MARTENS
ATTORNEYS.

INVENTOR.
NEIL R. WELSH
BY
FOWLER, KNOBBE & MARTENS
ATTORNEYS.

INVENTOR
NEIL R. WELSH
BY
FOWLER, KNOBBE
& MARTENS
ATTORNEYS.

INVENTOR.
NEIL R. WELSH
BY
FOWLER, KNOBBE & MARTENS
ATTORNEYS.

INVENTOR.
NEIL R. WELSH
BY
FOWLER, KNOBBE & MARTENS
ATTORNEYS.

United States Patent Office 3,427,535
Patented Feb. 11, 1969

3,427,535

SWEEP GENERATOR HAVING AUTOMATICALLY CONTROLLED CENTER FREQUENCY

Neil R. Welsh, Dana Point, Calif., assignor to Telonic Industries, Inc., a corporation of Indiana Continuation-in-part of application Ser. No. 621,325, Mar. 7, 1967. This application Feb. 19, 1968, Ser. No. 706,220
U.S. Cl. 324—57 26 Claims
Int. Cl. G01r *27/00, 23/00, 23/12*

ABSTRACT OF THE DISCLOSURE

A sweep generator whose center frequency $f_c$ is automatically controlled in the "wave track" mode to track the frequency pass band of a device under test or in the "marker track" mode to track a frequency marker pulse. In the "waveform track" mode, a differential amplifier compares the wave front and wave tail of the demodulated output of the device under test with a threshold potential level for selectively connecting first and second constant current sources of opposite polarity to an integrating capacitor. The voltage across this capacitor supplies a feedback control voltage to the sweep generator oscillator. In the "marker track" mode, the first current source is turned on at the initiation of each sweep frequency trace interval and the second current source is turned on by the marker input pulse so that the control voltage produced across the integrating capacitor varies in accordance with the difference between $f_c$ and the marker frequency $f_m$.

RELATED APPLICATIONS

This application is a continuation-in-part of application Ser. No. 621,325, filed Mar. 7, 1967, now abandoned.

BACKGROUND OF THE INVENTION

*Field of the invention*

This invention relates to improvements in cyclic frequency sweeping apparatus, commonly known in the art as sweep generators.

*Description of the prior art*

Heretofore, sweep generators have been used for displaying the frequency pass band of a device under test in basically two ways. In one technique, the sweep generator is adjusted to repetitively sweep from a frequency $f_1$ to a frequency $f_2$ where $f_1$ is made lower than the lowest frequency of interest and $f_2$ is made higher than the highest frequency of interest. Although a waveform corresponding to the pass band of the device under test will be observed and measured throughout its tuning range, this thechnique has the serious disadvantage that the oscilloscope display of the device has a very narrow width if the tuning frequency of the device under test has any appreciable range.

Another procedure commonly used is to adjust the sweep width of the sweep generator so that the display covers only those frequencies of interest for a particular setting of the center frequency $f_o$ of the device under test. Then, each time the tuning frequency of the device under test is changed, the operator also manually adjusts the center frequency $f_c$ of the sweep generator to maintain the display centered on the face of the oscilloscope. On assembly lines where each tuned amplifier, band pass filter, or the like is tested over its tuning range by a sweep generator, an appreciable amount of time and a considerable part of the attention of the operator are required to manually tune the sweep generator. This difficulty is aggravated when the ratio of the tuning range of the device under test is high in relation to the desired band width to be observed.

SUMMARY OF THE INVENTION

The present invention in the "waveform track" mode automatically adjusts the center frequency in accordance with changes in the tuning frequency of the device under test so as to maintain the display of its pass band centered on the oscilloscope display. This is accomplished by means responsive to the demodulated output waveform of the device under test which compares the wave front of this waveform with its wave tail and generates a feedback control signal which automatically varies the center frequency of the sweep frequency generator so as to maintain a predetermined relationship between the wave front and the wave tail. If no demodulated waveform is present (or is of insufficient amplitude), no waveform is, of course, displayed on the oscilloscope and the sweep generator is automatically caused to cycle upward in frequency to search for and capture the pass band of the device under test. When no demodulated waveform is detected and the sweep frequency generator reaches its highest output frequency, means automatically return the sweep generator to its lowest output frequency and the search cycle is repeated.

In the preferred embodiment of the present invention, the wave front and wave tail of the demodulated waveform are compared by detecting the times at which they intersect with a predetermined threshold voltage level. A first time interval is then measured between the initiation of the trace interval and the point of intersection of the wave front with the threshold voltage and a second time interval measured between the intersection of the wave tail and the threshold level and the end of the trace interval. Opposite polarity current sources are selectively connected to an integrating capacitor during these time intervals so that the net charge delivered to the capacitor is proportional to the difference between these respective time intervals. The voltage across the capacitor, corresponding to the integrated current value, is used to provide the feedback control voltage to maintain the center frequency $f_c$ substantially equal to the center frequency $f_o$ of the device under test.

A particular feature of this invention is that it considerably reduces the time and difficulty of measurement of the frequency response of tunable-pass band devices. Thus, the width of the oscilloscope may be used for displaying the pass band of the device under test while the center frequency of the tunable device is automatically maintained in the center of the oscilloscope display.

Another feature of the invention is that the instrument will automatically seek out and capture a desired response characteristic even as the device under test is being manually tuned.

In the "marker track" mode, a first time interval is measured between the initiation of the trace interval and the marker pulse and a second time interval measured between the marker pulse and the end of the trace interval. The opposite polarity current sources are selectively connected to the integrating capacitor during these time intervals to deliver a net current to the capacitor proportional to the difference between these respective time intervals. The feedback control voltage, derived from the voltage across the integration capacitor, increases or decreases the center frequency $f_c$ so as to locate the marker pulse at the center of the track interval.

This "marker track" mode also provides several significant advantages. In this mode, the sweep generator is readily programmed to a particular center frequency by generating an appropriate marker frequency. Also, a highly stable oscillator can be used to generate the marker frequency and provide a sweep generator having a long term center frequency stability comparable to that of the crystal oscillator.

Although of general utility, the "marker track" mode is especially useful in the television industry. Thus, it is frequently necessary during the manufacture of TV receivers to adjust the receiver tuner at several UHF channels while viewing its response characteristic on an oscilloscope. With the present invention, a crystal derived frequency marker pulse whose location corresponds to the center of the channel of interest is coupled to the marker input. The sweep generator then automatically centers on this channel. Predetermined plural ones of these channels may be so adjusted by selectively switching on a marker pulse at the requisite frequency. This marker pulse input is independent of any markers actually displayed on the oscilloscope screen—hence, it is at the operator's discretion to also use the marker pulse for display or to use still other marker inputs for display purposes.

DESCRIPTION OF THE PREFERRED EMBODIMENT

*Overall description of the sweep generator and oscillographic display system*

Figure 1:
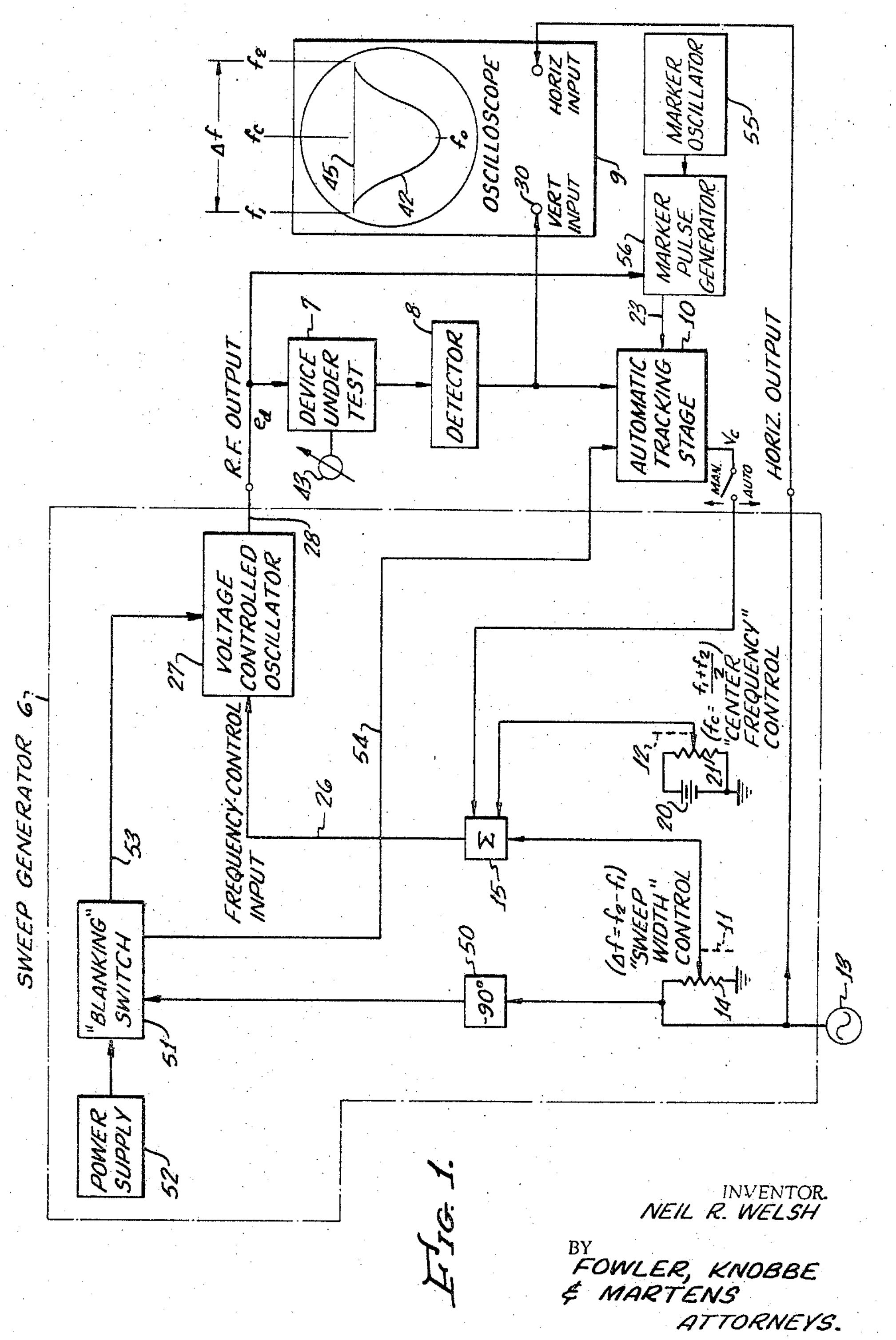
FIG. 1 is an overall block diagram of a sweep generator and oscillographic display system constructed in accordance with the present invention.

A sweep generator and oscillographic display system constructed in accordance with the present invention is illustrated in FIG. 1 and comprises a sweep generator 6 the device under test 7, detector stage 8, oscilloscope 9 and automatic tracking stage 10.

The sweep generator 6 includes a pair of manual adjustment controls 11, 12 for respectively adjusting the sweep width $\Delta f$ and the center frequency $f_c$. The sweep width control means includes a signal source 13 which produces a periodically varying waveform connected to the fixed terminals of a potentiometer 14. Typically, the source 13 is the AC power line, waveform 16 of FIG. 2*a* illustrating this 60 Hz. sine wave. The movable contact of potentiometer 14 is connected to a first input of a signal summing circuit 15, the magnitude of alternating current potential delivered to circuit 15 being determined by the position of the sweep width control 11. The center frequency control means comprises a direct current potential source 20 connected to the fixed terminals of a potentiometer 21 having its movable contact also connected to a second input of the summing circuit 15. Hence the magnitude of direct current potential delivered to circuit 15 is determined by the position of the center frequency control 12. When switch 22 is in the "Automatic" or down position, the third input to the summing circuit 15 comprises the output of the automatic tracking stage 10. This stage provides a feedback control voltage of sufficient amplitude so as to override the center frequency control 12 and vary the sweep generator 6 between its maximum and minimum output frequencies. This voltage is automatically caused to vary between these two limits to change the sweep generator center frequency $f_c$ in accordance with changes in the center frequency $f_0$ of the device under test in the "waveform track" mode or with changes in the external frequency marker on input 23 in the "marker track" mode. The resultant summation of these three signals by circuit 15 provides on lead 26 the control voltage input to the voltage controlled oscillator (VCO) 27 which supplies the output frequency signal of the sweep generator on lead 28.

The output signal of VCO 27 is connected to the device under test 7 and the resultant signal at the output of this device is connected either directly to the vertical deflection circuit input 30 of the oscilloscope 9 if the device under test incorporates a detector stage, or, as shown, is coupled to the vertical input terminal through a detector stage 8 if the device under test does not include a demodulation stage. The horizontal deflection circuit input terminal 31 of the oscilloscope is connected as shown to the source 13 of alternating current potential.

The output sweep frequency signal produced at the output 28 of the sweep generator 6 is illustrated as waveform 40 in FIG. 2*c*—this signal comprising a constant amplitude, frequency modulated signal which varies in frequency with time over the frequency bandwidth $\Delta f$ centered at the center frequency $f_c$. The falling portion of each cycle of AC waveform, i.e., that portion between times $t_0$ and $t_4$, applied to the VCO (derived from source 13 and potentiometer 14) produces a continuous frequency change over a frequency band $\Delta f$ preselected by the sweep width control 11, i.e., the larger the AC signal magnitude, the larger the bandwidth $\Delta f$. In the "manual" mode, the center frequency $f_c$ is determined by the position of the center frequency control 12. This voltage is overridden by the output of the automatic tracking stage in the "automatic" mode—the center frequency $f_c$ then being determined by the output of the automatic stage 10. The lowest frequency $f_1$ and the highest frequency $f_2$ are related to the bandwidth and center frequency $f_c$ by the equations:

$$f_2 - f_1 = \Delta f \quad (1)$$

$$\frac{f_1 + f_2}{2} = f_c \quad (2)$$

Figure 2:
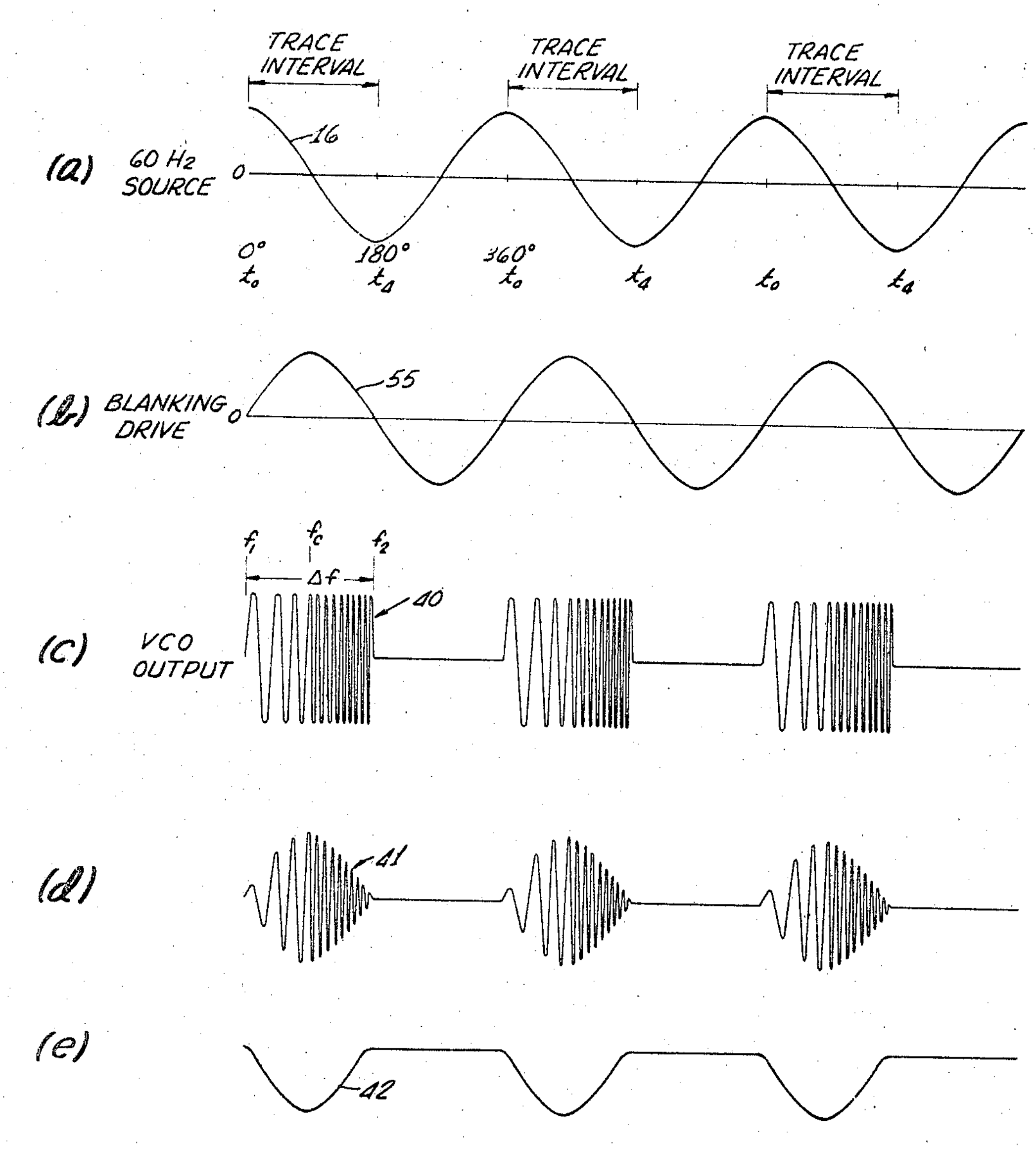
FIGS. 2*a*, *b*, *c*, *d* and *e* illustrate waveforms at various points in the system of FIG. 1.

Advantageously, the bandwidth $\Delta f$ of sweep frequency signal 40 is set by control 11 to extend only slightly beyond the lower and the upper limits of the bandwidth of interest of the device under test 7 so as to obtain maximum width of the displayed response on the oscilloscope. Device 7 may be either a passive or active network and one which ordinarily contains a tuned circuit, e.g., a band pass filter, an intermediate frequency amplifier stage or the like. Such devices are frequency selective, that is, they readily pass certain frequencies while attenuating others, thereby amplitude modulating the input sweep frequency signal 40 to produce a resultant output waveform 41 as shown in FIG. 2*d*. This waveform is demodulated in detector stage 8 for reproducing one-half of the envelope of waveform 41 (the bottom half being shown in FIG. 2*c*) and this detected waveform—whose contour represents the band-pass curve of the device under test as shown at 42 in FIG. 2—is oscilloscopically displayed on the face of the oscilloscope 9. The center frequency $f_o$ of this band-pass curve may be fixed, or may be varied by a control 43 of the device 7.

Oscilloscope 9 is synchronized with the sweep frequency output signal 40 by means of their common connection to the AC source 13. Thus, during each time interval $t_0$–$t_4$, denoted herein as the trace interval, the horizontal deflection circuitry of oscilloscope 9 translates the electron beam from left to right across the face of the tube, so as to display the detected waveform 42. Each trace interval occupies only 180° of each cycle of the AC waveform 16. During the remaining 180° portion, the oscillator output is turned OFF or blanked so that the electronic beam will retrace against the zero base line 45. Blanking is provided by the 90° phase shift network 50 and the blanking switch 51 connecting the power supply 52 to the input bus 53 of the VCO. The AC waveform 55 out of network 50 is shown in FIG. 2*b* and lags waveform 16 by 90°. Switch 51 is driven ON during the positive half-cycles of waveform 55 and driven off during the negative half-cycles; accordingly, switch 51 is turned ON during the trace interval but turned OFF between the end of one trace and the initiation of a succeeding interval. Power is thus removed from the oscillator during the same blanking interval that the electron beam retraces from the right to the left hand side of the oscilloscope face. Also, as shown, the blanking switch is connected to the automatic tracking stage 10 by lead 54 so that this stage is also inhibited during the blanking interval.

In the "waveform track" mode, the function of the automatic tracking stage 10 is to maintain the center frequency $f_c$ of the sweep frequency output of the VCO substantially equivalent to the center frequency $f_0$ of the device under test. As shown, stage 10 is responsive to the demodulated waveform and produces an output voltage which is fed back to the summation circuit 15 for increasing or decreasing the center frequency of the VCO should the frequencies $f_c$ and $f_o$ deviate from each other. Accordingly, an operator calibrating, aligning or otherwise testing the frequency response of an electrical network 7 is not required to manually tune the sweep generator in order to follow adjustments made in the center frequency of the network being tested. For example, the frequency response characteristics of an RF preselector stage may be very quickly tested over wide range of settings with an instrument constructed in accordance with this invention since the operator need only vary the tuning control 43 of the RF preselecor and observe its frequency response band-pass curve on the face of the oscilloscope.

In the "marker track" mode, a marker pulse is supplied on input 23. Typically, this marker pulse is supplied from the marker pulse generator 56 which compares the sweep generator signal on lead 28 with the frequency $f_m$ of marker oscillator 55 and produces a pulse on lead 23 each time the sweep frequency coincides with $f_m$. The automatic tracking stage responds to this pulse to maintain $f_c$ equal to $f_m$.

*General description of the automatic tracking stage-waveform track mode*

Figure 3:
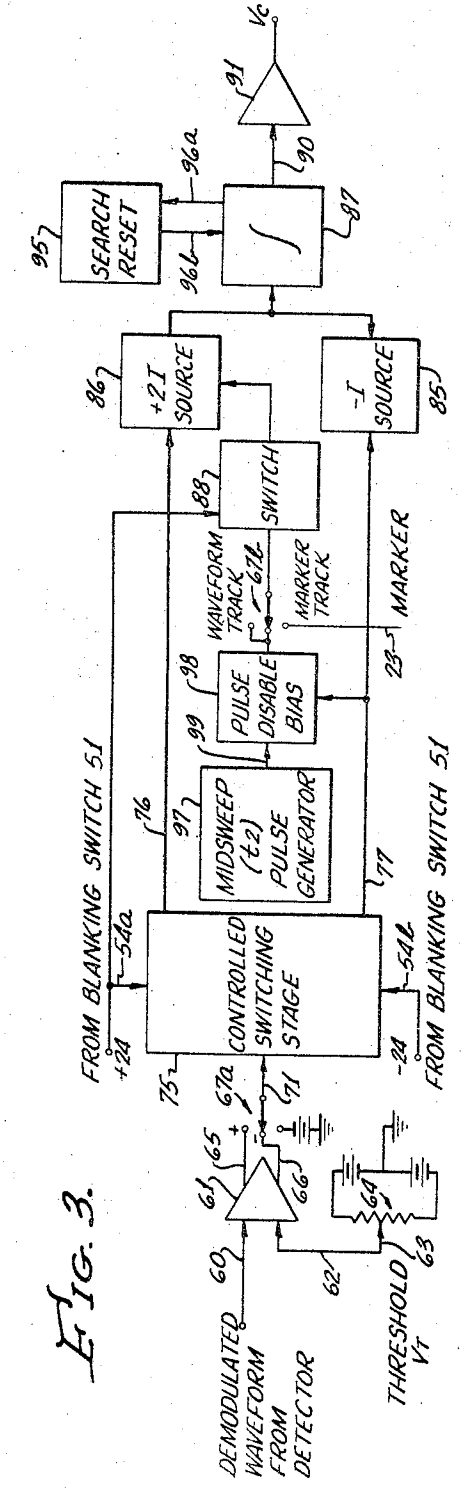
FIG. 3 is a block diagram of the automatic tracking stage of FIG. 1.

Referring to FIG. 3, an exemplary embodiment of the automatic tracking stage 10 is shown in block diagram form. The demodulated waveform 42 ($e_d$) from the detector is introduced on input lead 60 of a differential amplifier 61. The other input lead 62 of this amplifier stage is connected to the potential $V_T$ provided by the movable contact 63 of potentiometer 64 whose fixed terminals are connected to respective positive and negative sources of potential. As shown in FIGS. 4*a* and 4*b*, the demodulated waveform $e_d$ may thus range between positive and negative values, $V_T$ being normally set to a negative voltage when $e_d$ is a negative going waveform 65 and to a positive voltage when $e_d$ is the positive going signal 66.

The differential amplifier 61 includes a pair of output leads 65, 66 respectively connected to fixed contacts of three-position switch having ganged portions 67*a* and 67*b*. In the "waveform track" mode, the switch 67 is in its upper or intermediate positions and the operation of the differential amplifier is such as to produce on output lead 65 an output control current $i_o$ proportional to the difference between $e_d$ and $V_T$, i.e.

$$i_o \sim e_d - V_T (e_d > V_T) \quad (3)$$

$$i_o = o (e_d < V_T) \quad (4)$$

and an inverted output on lead 66, i.e.

$$i_o \sim V_T - e_d (e_d < V_T) \quad (5)$$

$$i_o = o (e_d > V_T) \quad (6)$$

Figure 4:
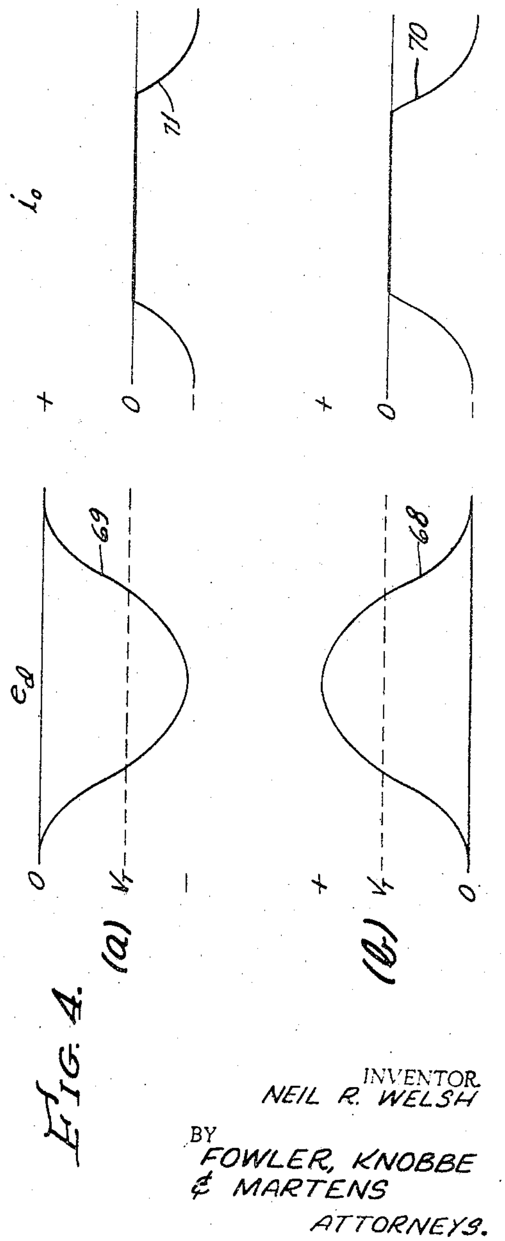
FIGS. 4*a* and *b* illustrate the input and output waveforms of the differential amplifier of the system of FIG. 3.

Switch 67*a* is moved to its upper + terminal for positive going $e_d$ waveforms, as shown in FIG. 4*b* as waveform 68 and to its intermediate — terminal for negative going $e_d$ waveforms, as shown in FIG. 4*a* as waveform 69. The resulting currents on switch output lead 71 are plotted in FIG. 4 as respective waveforms 70, 71 alongside the associated input waveforms 68, 69 and threshhold potential $V_T$. These currents are connected to the input of the controlled switching stage 75.

Figure 5:
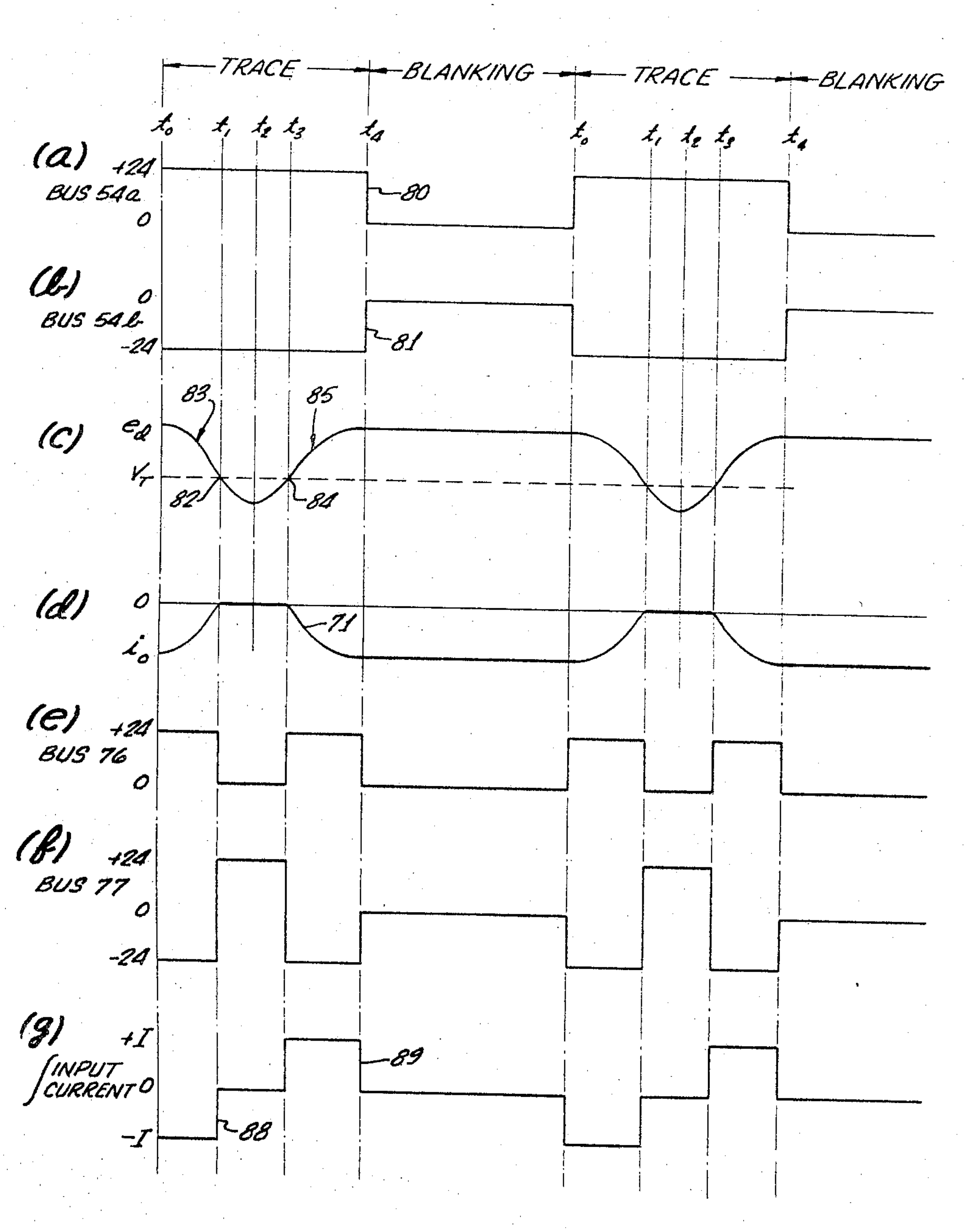
FIGS. 5*a*, *b*, *c*, *d*, *e*, *f* and *g* illustrate waveforms at several points in the system of FIG. 3.

Switching stage 75 is connected to a pair of electrical busses 54*a* and 54*b* which are respectively energized at + and — 24 volts during the trace interval by blanking switch 51. The function of stage 75 is to utilize these potentials to energize a pair of output busses 76, 77 in accordance with the current in lead 71. Referring to FIG. 5, the voltage on bus 54*a* is shown in FIG. 5*a* at 80, the voltage on bus 54*b* is shown in FIG. 5*b* at 81, the demodulated waveform 69 ($e_d$) is reproduced from FIG 4*a* in FIG. 5*c*, and the corresponding differential amplifier output signal 71 ($i_o$) is reproduced in FIG. 5*d*. The point 82 at which the wave front 83 of the demodulated waveform $e_d$ and threshold potential $V_T$ are equal in magnitude defines a time $t_1$ and the point 84 at which the wave tail 85 of the demodulated waveform and voltage $V_T$ are equal defines a time $t_3$ as labeled in FIG. 5. During the first measured time interval of $t_0$ to $t_1$ and the second measured time interval $t_3$ to $t_4$ of each trace interval in which the demodulated waveform exceeds in magnitude the potential of the threshold potential, the controlled switching stage 75 responds to the negative current of $i_o$ by supplying +24 volts on bus 76 and —24 volts on bus 77, as shown in FIGS. 5*e* and 5*f*. Between time $t_1$ and $t_3$, the absence of $i_o$ causes bus 76 to be grounded and bus 77 to be raised to +24 volts. During the blanking intervals between each trace interval, the busses 54*a* and 54*b* are grounded by blanking switch 51, likewise resulting in the grounding of busses 76 and 77.

The respective first and second time periods $t_0$–$t_1$ and $t_3$–$t_4$ are compared and a control voltage $V_c$ corresponding to a difference therebetween is produced by means of a first constant current source 85, a second constant current source 86 and an electrical integrating circuit 87 coupled thereto. The first current source 85 is responsively coupled to output bus 77 and is energized when this bus is energized with −24 volts, i.e. during the demarcated time intervals $t_0$–$t_1$ and $t_3$–$t_4$. The second current source 86 is responsively connected to output bus 76 and the output of switch 88 and is energized when both switch 88 is ON and output bus 76 is energized with +24 volts. As will be described in more detail below, this insures that the source 86 is energized only during the second time interval $t_3$–$t_4$ when a demodulated waveform is present on input lead 60.

Assuming that the demodulated waveform 69 is present, the first current source 85 is poled to remove a constant current of I from the integrator during the first time interval as shown at 88 in FIG. 5*g*. At time $t_2$, the time coincident with the center of the trace interval, the midsweep pulse generator 97 provides a pulse output on lead 99 which is conducted through the pulse disable bias stage 98 to turn switch 88 ON if the potential on output bus 77 is then +24 volts, thereby enabling the second current source 86 which is subsequently turned ON at time $t_3$ by the +24 volts on output bus 76. Source 86 is poled to supply +2I current to the integrator 87 so that simultaneously a constant current of 2I is supplied to the integrator while a constant current of I is removed; therefore, a net current of +I is introduced into the integrator during the time interval $t_3$–$t_4$ as shown at 89 in FIG. 5*g*. The resulting output of the integrator on lead 90 is a voltage which varies in accordance with the net integrated current during each trace interval. Thus, when the respective first and second time intervals are substantially equal, the output voltage on lead 90 will remain close to zero volts whereas this voltage will vary in magnitude and polarity as one or the other of the time intervals becomes longer or shorter than the other. This potential is connected to the input of an output amplifier 91 to produce the requisite control voltage $V_c$ on the output lead of the automatic tracking stage, this voltage being fed back to control the center frequency of the sweep generator oscillator 6 as described above and illustrated in FIG. 1.

Whenever there is no demodulated waveform, or whenever this waveform fails to exceed the threshold level, the output bus 77 remains at −24 volts during the entire trace. This negative potential is detected by the pulse disable bias stage 98 which inhibits transmission of the pulse on lead 99 to switch 88. Switch 88 then remains OFF and the second current source 86 is prevented from being turned ON. Also, when the demodulated waveform fails to exceed the threshold level, the first constant current source is energized during the entire trace interval—$t_0$ to $t_4$. Accordingly, current is withdrawn from the integrator during the entire portion of each trace interval causing its voltage $V_c$ to fall. If no demodulated waveform is encountered, the output voltage $V_c$ continues to fall during each trace interval until a preset voltage level, for example −18 volts, is reached which corresponds to maximum or greater than maximum output frequency from the sweep generator oscillator. At this time, a search reset switch 95 coupled to the integrator 87 by lead **96*a* is also energized and drives the integrator over output lead 96*b* until its voltage is changed to a preset level such that the sweep generator oscillator is driven to its minimum output frequency. The search reset circuit 95** then automatically turns OFF and the sweep generator recycles upward in frequency during each trace interval until a demodulated waveform is detected or the minimum control voltage $V_c$ is again produced at the output of the automatic tracking stage.

Figure 6:
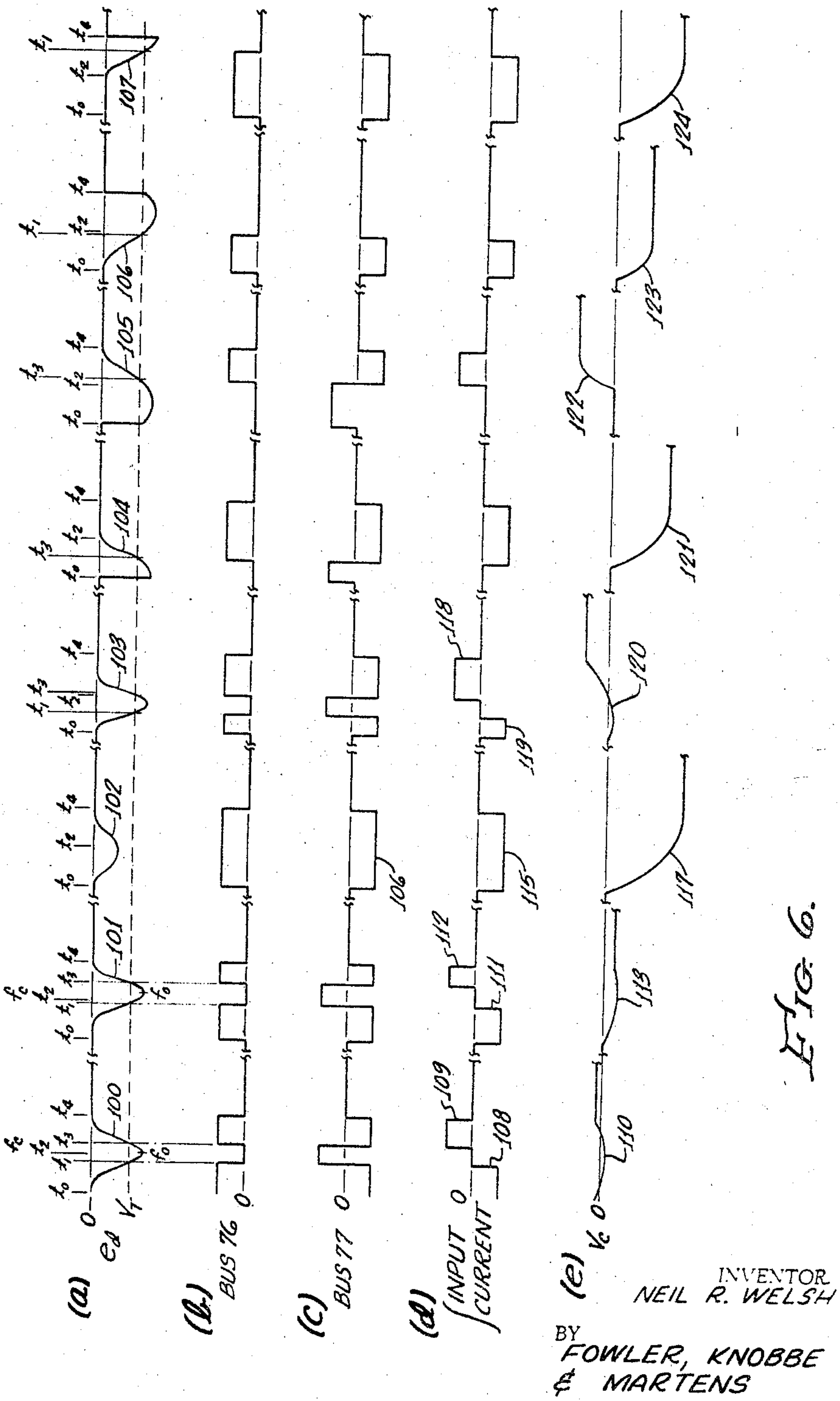
FIGS. 6*a*, *b*, *c*, *d* and *e* further illustrate waveforms of the system of FIG. 3 resulting from typical operating conditions in the "waveform track" mode.

A further understanding of the operation of the automatic tracking stage 10 in the "waveform track" mode may be obtained from FIG. 6 which illustrates the manner in which the control voltage $V_c$ is varied in accordance with variations between the VCO center frequency $f_c$ and the center frequency $f_o$ of the device under test. Such a change occurs, for example, when the tuned frequency of an RF preselector is changed by adjusting its $f_o$ control 43. FIG. 6*a* illustrates a series of demodulated waveforms resulting from changes between these two frequencies, beginning with waveform 100 in which the frequencies $f_c$ and $f_o$ are the same so that the crest of the waveform occurs at time $t_2$. The next succeeding demodulated waveform 101 has a center frequency $f_o$ somewhat higher than the VCO center frequency $f_c$ so that its crest is displaced toward time $t_4$. The following demodulated waveform 102 is of insufficient amplitude to cross the threshold level $V_T$. Waveform 103 illustrates the demodulated waveform in which the VCO center frequency is slightly higher than the center frequency $f_o$ of the network being tested.

Waveform 104 is produced by a tuned circuit whose center frequency is sufficiently lower than the center frequency of the sweep generator that only the wave tail of the waveform is displayed and intersects the threshold voltage prior to time $t_2$. Waveform 105 further illustrates the case in which the frequency $f_o$ is less than the frequency $f_c$; however, in this example, the difference therebetween is smaller so that both the wave tail and a portion of the wave front are displayed and the wave tail intersects the threshold voltage after time $t_2$. Waveform 106 is displayed when the center frequency of the device under test is somewhat higher than the sweep frequency generator so that all of the wave front and only a small portion of the wave tail are displayed. A larger frequency differential produces the waveform 107 in which only the wave front or a portion thereof is displayed.

FIGS. 6*b* and 6*c* illustrate the resulting waveforms applied to the busses 76, 77. Of particular interest is the retention of bus 77 at −24 volts during the entire trace interval of waveform 102.

Also, note that the demodulated waveforms 104 and 105 exceed the threshold potential at time $t_0$; hence, bus 76 is held at ground potential and bus 77 is held at +24 volts until the intersection of the wave tail and the threshold level.

The resulting current supplied to the integrator 87 for the several demodulated waveforms 100, 101, 102, 103, 104, 105, 106 and 107 is shown in FIG. 6*d*. For the initial demodulated waveform 100, the times $t_0$–$t_1$ and $t_3$–$t_4$ are identical; therefore, equivalent magnitudes of current are taken from the integrator during the first time interval as shown at 108 and delivered to the integrator during the second time interval as shown at 109. As a result, the voltage $V_c$ remains essentially the same during this trace interval as shown in FIG. 6*e* at 110 and likewise the center frequency of the oscillator remains essentially constant. A different result is provided by the demodulated waveform 101 since the first time interval $t_0$–$t_1$ is substantially longer than the second time interval $t_3$–$t_4$. As a result, a greater magnitude of current is taken from the integrator during the first time interval as shown at 111 than is supplied thereto during the second time interval as shown at 112. As a result, the voltage level $V_c$ falls during this trace interval as shown at 113 causing a corresponding rise in the center frequency of the sweep generator oscillator 27.

During the trace interval coinciding with demodulated waveform 102, a current of −I is continuously withdrawn from the integrator during the entire trace interval as shown at 115. This produces a falling voltage $V_c$ as indicated at 117 and a corresponding increase in the center frequency of the VCO 27. For the demodulated waveform 103—illustrating the condition in which the VCO center frequency is somewhat above that of the device under test—the first time interval $t_0$–$t_1$ is less than the second time interval $t_3$–$t_4$. As a result, a greater amount of current is delivered to the integrator as shown at 118 than is taken therefrom as shown at 119 and hence, the voltage $V_c$ rises during this time interval as shown at 120 and the frequency of the VCO decreases.

In the example illustrated by demodulated waveform 104 wherein the band pass device under test has been tuned such that its center frequency is sufficiently below the frequency $f_c$ that only the wave tail portion of the waveform is displayed, the first current source 85 is energized when the wave tail intersects the threshold potential and remains energized until the end of the trace interval. The pulse disable bias stage 101 inhibits transmission of the pulse on lead 102 by virtue of the negative potential on bus 77 at time $t_2$ so that the second current source 86 remains off during this trace interval. As a result, the negative going voltage $V_c$ indicated at 121 is supplied to the VCO resulting in an increase in the center frequency $f_c$. Accordingly, in this operating condition, the VCO is driven away from the frequency $f_o$ so that tracking is interrupted until the search reset means 95 causes the sweep generator to recycle to its minimum output frequency and subsequently attain the frequency $f_o$ of the device under test. However, a typical time required for a complete recycle is of the order of a second so that for all practical purposes, the oscilloscope display is locked to the demodulated waveform substantially instantaneously.

For the conditions illustrated by the remaining demodulated waveforms 105, 106 and 107, the frequency $f_c$ is changed to center the display in even a shorter time interval. Thus, for the demodulated waveform 105 in which the bus 77 is held at +24 volts at time $t_2$, the switch 88 therefore turns on at time $t_2$ causing source 86 to be turned on at the time of intersection of the wave tail with the threshold level. Likewise, the first current source 85 is turned on at this same time because of the change on bus 77 from +24 to −24 volts. As a result, a net current of I is delivered to the integrator 77 for the remainder of the trace interval and a positive going voltage $V_c$ shown at 122 produced at the output of the automatic tracking stage. This rising voltage causes a decrease in frequency $f_c$ so as to bring $f_c$ closer to $f_o$ and achieve the operating condition shown by demodulated waveform 101 in which the frequency $f_o$ is centered on the oscilloscope display.

Demodulated waveforms 106 and 107 turn the first current source 85 on during an interval between time $t_0$ and the time that the wave front intersects the threshold potential. The second current source 86 remains off during the entire trace interval for both of these examples. In the first case shown by waveform 106, bus 76 remains grounded during this time interval thereby preventing source 86 from being turned on. In the other example, illustrated by waveform 107, in which the wave front does not intersect the threshold potential until after time $t_2$, the pulse disable bias stage 101 sees the negative potential on bus 77 at time $t_2$ and prevents switch 88 from receiving the pulse at $t_2$ to enable the source 86. Hence, for both waveforms 106 and 107, the current −I is integrated for a time proportional to the difference between $f_o$ and $f_c$ with resulting proportional control voltage $V_c$ as illustrated at 123 and 124 being fed back to the VCO. This negative going potential increases the frequency $f_c$ so that the demodulated waveform is locked on to the center frequency $f_o$ of the device under test.

*General description of the automatic tracking stage-"marker track" mode*

The "marker track" mode is obtained by operating switch 67 to its lower or "marker track" position. In this operational mode, the marker input pulses on lead 23 are applied to the switch 88 via switch 67*b*. Switch stage 67*a* applies a negative bias to the control switching stage 75 so that the busses 76 and 77 are retained at +24 and −24 volts during the entire trace interval. Thus, at the initiation of each trace interval, the first current source 85 is turned on and draws a current of I magnitude from the integrator during the entire trace interval. At $t_m$, the time of the marker input pulse, the second current source is turned on with the net result that the integrator has a current I withdrawn from it prior to the marker pulse and a current I supplied to it after the marker pulse. During the blanking interval, there is no current supplied thereto since both current sources are turned off. The net current into the integrator is then a function of the ratio or difference between the time period $t_4$–$t_m$ and $t_m$–$t_0$. This provides a feedback voltage $V_c$ of the appropriate polarity so as to tune the sweep generator to center the marker input pulse between $t_0$ and $t_4$.

Figure 7:
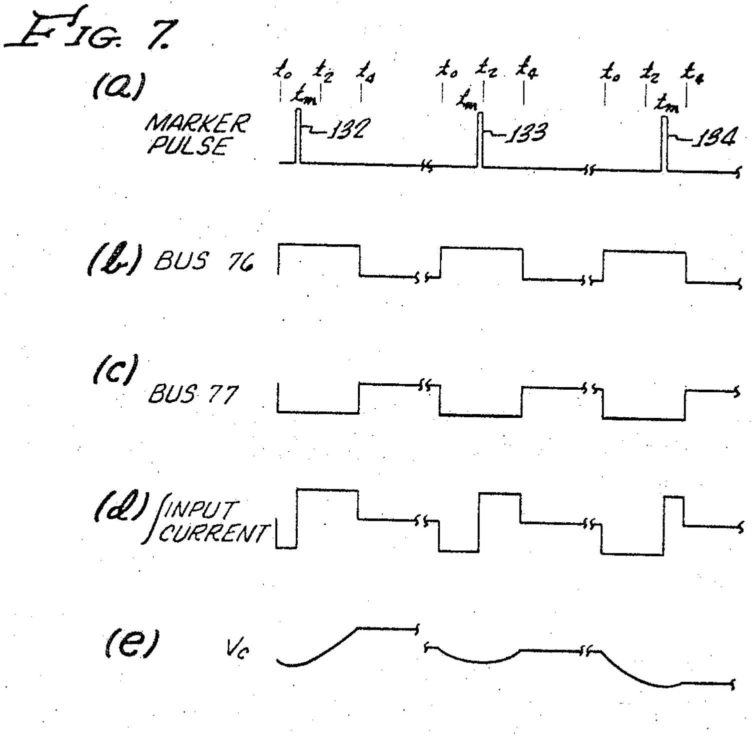
FIGS. 7*a*, *b*, *c*, *d* and *e* further illustrate waveforms of the system of FIG. 3 resulting from typical operating conditions in the "marker track" mode.

The operation in the "marker track" mode is illustrated in FIG. 7. FIG. 7*a* illustrates the positive going marker pulses applied to marker input 23, FIGS. 7*b* and 7*c* respectively illustrate the waveforms on busses 76 and 77, FIG. 7*d* illustrates the current applied to the integrator 87, and FIG. 7*e* illustrates the control voltage $V_c$. In the first example, marker pulse 132 occurs at a time $t_m$ prior to the center of the trace interval, i.e. the marker frequency $f_m$ is less than the sweep generator center frequency. As a result, a greater amount of charge is delivered to the integrator during the time interval $t_m$–$t_4$ than is withdrawn from the integrator during the shorter time interval $t_0$–$t_m$. The resultant rise in control voltage $V_c$ acts to reduce the center frequency of the VCO and thus center the marker pulse between the times $t_0$ and $t_4$.

In the second example, marker pulse 133 occurs at the desired time $t_2$ between $t_0$ and $t_4$. Hence, the net value of charge delivered over the trace interval is zero with the result that the voltage $V_c$ and sweep generator center frequency do not essentially change.

In the third example shown, the marker pulse 134 occurs at a time $t_m$ between $t_2$ and $t_4$. More charge is then withdrawn over the time interval $t_0$–$t_4$ than is supplied to the integrator during the shorter time interval $t_m$–$t_4$. The falling control voltage $V_c$ then increases the sweep frequency center frequency to match $f_m$.

*Detailed description of automatic tracking stage*

Figure 8:
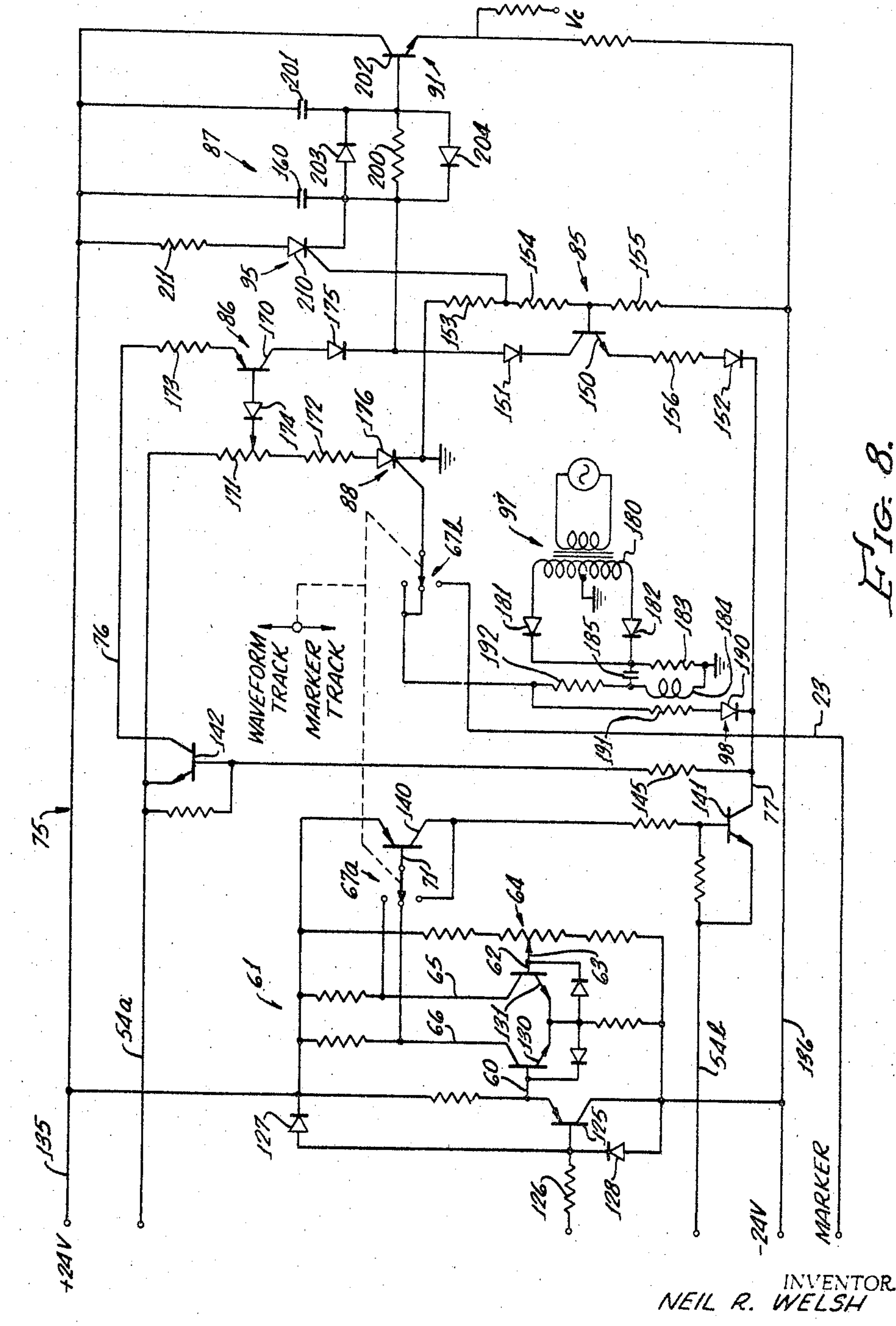
FIG. 8 is a detailed schematic of the automatic tracking stage of FIG. 3.

*Differential amplifier 61.* A detailed schematic of the preferred embodiment of the invention is shown in FIG. 8. The input demodulated waveform $e_d$ is brought to the base of transistor 125 through resistor 126, transistor 125 being connected as an emitter follower to increase the input impedance of this stage. Resistor 126 and diodes 127, 128 primarily serve as protective devices so that the input voltage will not damage the input amplifier. The output of the emitter follower 125 is fed to one input 60 of a differential amplifier 61 including transistors 130, 131 and their associated resistors. The other input 62 of the differential amplifier is connected to the movable arm 63 of potentiometer 64 supplied with positive and negative voltages from +24 volt bus 135 and −24 volt bus 136. The non-inverted and inverted outputs 65, 66 of the differential amplifier are respectively obtained from the collector of transistor 131 and the collector of transistor 130, these electrodes being connected to respective fixed contacts of switch 67*a*.

*Controlled switching stage 75.*—The selected output of the differential amplifier through the movable arm 3 of switch 67*a* is fed to the input 71 of the controlled switching stage 75, this stage comprising transistors 140, 141 and 142. As shown, lead 71 is coupled to the base of transistor 140 connected as a grounded emitter amplifier for controlling the conduction of transistor 141. With switch 67*a* in the intermediate "invert" position as shown, when the base of transistor 130 is less negative than the preset value $V_T$ placed on the base of transistor 131, transistor 130 conducts. The connection between its collector and transistor 140 via the inverted output lead 66 and switch 67 causes a flow of base current to transistor 140 which in turn supplies base current to transistor 141 which saturates. The emitter of transistor 141 is connected to the input bus 54*b* and its collector is connected to the output bus 77. When transistor 141 is saturated, its collector voltage is essentially that of its emitter terminal or −24 volts during the trace interval. The collector of transistor 141 is also connected through resistor 145 to the base of transistor 142 so that the presence of −24 volts on the collector of transistor 141 in turn supplies base current to transistor 142, causing this transistor also to saturate. The emitter of this latter transistor is connected to the bus 54*a* and its collector is connected to the output bus 76; accordingly, saturation of transistor 142 supplies +24 volts to the output bus 76.

Similarly, when the base of transistor 130 is less positive than the preset value placed on the base of transistor 131, i.e. the condition shown in FIG. 4(*b*) when the demodulated waveform 68 is less than $V_T$, the transistor 131 conducts and its collector serves as the non-inverted output 65. Switch 67*a* is then thrown to its up "non-invert" position, causing transistors 140, 141, and 142 to saturate and control the busses 54*a* and 54*b* in the desired manner.

*−I source 85*.—The first constant current source 85 comprises transistor 150, diodes 151, 152 and resistors 153, 154, 155 and 156. Resistors 153, 154 and 155 form a voltage divider between the −24 volt supply bus 136 and ground to apply a voltage to the base of transistor 150. When the output bus 77 is held at −24 volts, transistor 150 conducts that amount of current necessary to bring its emitter to base voltage to very nearly zero volts, thereby establishing a voltage across resistor 156 substantially equivalent to the voltage through resistor 155. The current flowing through resistor 156 is relatively independent of the transistor collector voltage; hence, the transistor functions as the desired constant source of current. This constant current flows through transistor 150 from integrating capacitor 160 when the output bus 77 is energized at −24 volts, e.g. during the first and second time intervals when a demodulated waveform is present at the input of the stage as shown in FIG. 6.

*+2I current source*.—The second current source 86 comprises transistor 170, potentiometer 171, resistors 172 and 173, and diodes 174, 175. Potentiometer 171 and resistor 172 are connected in series between the bus 54*a* and controlled rectifier (SCR) 176. When SCR 176 is fired, it has a very low impedance between its anode and cathode electrodes and a voltage is developed between the movable contact of potentiometer 171 and bus 54*a* which is a function of the setting of the potentiometer. At time $t_3$, when bus 76 goes to +24 volts as shown in FIG. 6, transistor 170 provides a current flow through resistor 173 which is relatively independent of the transistor collector voltage. Potentiometer 171 is set so that the magnitude of this current is twice the magnitude of the constant current provided by source 85. This current of magnitude 2I flows through the transistor 170 and diode 175 into the integrating capacitor 160.

Figure 9:
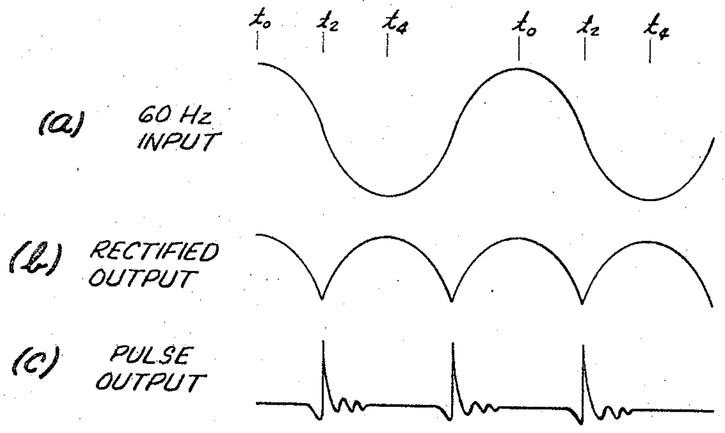
FIGS. 9*a*, *b* and *c* illustrate the input and output waveforms of the mid-sweep pulse generator stage shown in FIG. 8.

*Mid-sweep pulse generator 97*.—This stage comprises a full wave rectifier comprising power transformer 180 and diodes 181, 182 and in addition, resistor 183, inductor 184, and capacitor 185. Transformer 180 is energized from a 60 Hz. source (shown in FIG. 9*a*) and develops a full wave rectified voltage across resistor 183. As shown in FIG. 9*b*, the input *ac* crosses the zero axis at time $t_2$ during the trace interval, at which time the voltage across resistor 183 is also reduced to zero. This voltage change when shaped by capacitor 185 and inductor 184, provides a short duration positive pulse 186 (FIG. 9*c*) which is fed through switch 67*b* in the "waveform track" mode to the trigger input of SCR 176. This pulse results in a current flow to the control electrode of the SCR, causing this device to fire during the trace interval when its anode and cathode are forwardly biased by bus 54*a*. A positive pulse 187 is also produced during the blanking interval; however, the SCR is then back biased and remains nonconductive.

For systems in which the trace interval is some other time interval than ½ of the 60 Hz. cycle, other means well known in the art may be used to produce a pulse at the center of the trace interval. By way of specific example, a one-shot multivibrator (not shown) having a firing interval equivalent to the time period $t_0$–$t_2$ may be triggered at the initiation of each trace interval and its output used to trigger SCR 173.

*Switch 88*.—The SCR 176 functions as switch 88. This circuit element provides a high resistance between its anode and cathode until it is fired by a small current flow to its control electrode. In the "waveform track" mode, SCR 176 is fired by the differentiated pulse produced by the pulse generator 97 and connected through the upper and intermediate positions of switch 67*b*. In the "marker track" mode, this element is fired by positive going marker track pulses applied on marker input 23 and connected through the lower position of switch 67*b*. When fired, its anode electrode is essentially connected to ground potential and held there until the initiation of the blanking period, thus enabling the second current source 86. During blanking, bus 54*a* is grounded and the current through potentiometer 171 and resistor 172 falls below the minimum hold current on the SCR. The SCR 176 is then turned off until subsequently triggered by pulse generator 97.

*Pulse disable bias 98*.—This stage comprises diode 190 and resistors 191 and 192 and functions to reverse bias the control electrode of the SCR when bus 77 is held at −24 volts. A pulse is then prohibited from triggering the control electrode of the SCR, thereby inhibiting the second current source 86.

*Integrator 87*.—Capacitor 160 provides the primary integrating function of the respective currents supplied by the opposite polarity constant current sources 85 and 86. The flow of a constant value of current through capacitor 160 produces a linearly rising or falling voltage across its terminals. This voltage is smoothed by the RC circuit comprising resistor 200 and capacitor 201. This filtered voltage is applied through the output amplifier 91 comprising transistor 202 to the output terminal of the automatic tracking stage.

Integrator 87 further includes diodes 203 and 204. During normal operation, i.e. when the demodulated waveform or the marker input pulse is centered, the voltage drop across resistor 202 is less than the threshold voltage of these diodes and accordingly, these diodes do not then effect the circuit operation. When the waveform or marker pulse is substantially off center on the scope, the voltage developed across resistor 202 is large enough so that it will exceed the threshold voltage of diode 203 or 204. This will tend to reduce the RC time constant of the smoothing circuit and will cause the voltage on capacitor 201 to more rapidly follow the voltage on capacitor 160. In this manner, large corrections can be made to the output control voltage $V_c$ when they are needed for following the input demodulated waveform or marker pulse.

*Search reset stage 95*.—A second SCR 210 having its cathode connected to one side of capacitor 160 and its anode connected through resistor 211 to the other side of capacitor 160 provides the search reset stage. Voltage is applied to the control electrode of SCR 210 by virtue of its potentiometric connection between resistors 153 and 154. However, SCR 210 is normally in its non-conductive state because the control electrode is reverse biased. When a demodulated waveform fails to appear at input 60, the first current source 85 continues to withdraw current from and provide an increasing voltage drop across capacitor 160. When a predetermined voltage is reached across capacitor 160, the control electrode is forward biased, triggering the SCR. The cathode of SCR 210 then rises to approximately 24 volts, which level is also seen at the base and emitter of transistor 202 via diode 203. This change in $V_c$ results in a rapid increase in the sweep frequency generator to its minimum center frequency. In the mean-time, the capacitors 160 and 201 discharge through resistor 210 and the then conductive SCR 210 until the current flow through the SCR falls below its minimum hold current. The SCR then turns off, initiating a new search cycle.

A FURTHER EMBODIMENT OF THE AUTOMATIC TRACKING STAGE

Figure 10:
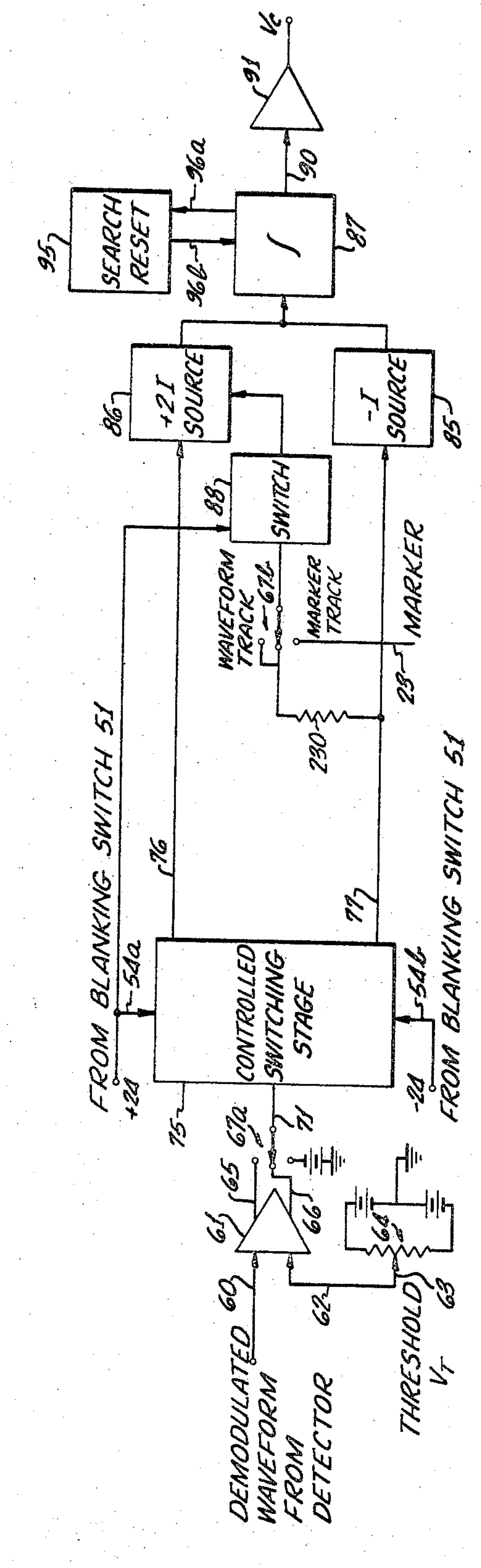
FIG. 10 is a block diagram of another embodiment of an automatic tracking stage constructed in accordance with this invention.

An additional exemplary embodiment of the automatic tracking stage 10 is shown in block diagram form in FIG. 10. Since both the structure and function of the system of FIG. 10 are quite similar to that of the embodiment previously described and illustrated in FIGS. 3 and 8, the same nomenclature has been used in FIG. 10 for those elements which may be the same as those shown in FIGS. 3 and 8. The demodulated waveform ($e_d$) from the detector, of which representative examples are shown in FIG. 11*a*, is introduced on input lead 60 of the differential amplifier 61. The other input lead 62 of this amplifier stage is connected to the potential $V_T$ provided by the movable contact 63 of potentiometer 64 whose fixed terminals are connected to respective positive and negative sources of potential. As shown in FIGS. 4*a* and 4*b*, the demodulated waveform $e_d$ may thus range between positive and negative values, $V_T$ being normally set to a negative voltage wheen $e_d$ is a negative going waveform 65 and to a positive voltage when $e_d$ is the positive going signal 66.

The differential amplifier 61 includes a pair of output leads 65, 66 respectively connected to fixed contacts of three-position switch having ganged portions **67*a* and 67*b*. In the "waveform track" mode, the switch 67 is in its upper or intermediate positions and the operation of the differential amplifier is such as to produce on output lead 65 an output control current $i_o$ proportional to the difference between $e_d$ and $V_T$. As in the embodiments of FIGS. 3 and 8, switch 67*a*** is to its upper + terminal for positive going $e_d$ waveforms, as shown in FIG. 4*b* as waveforms 68 and to its intermediate — terminal for negative going $e_d$ waveforms, as shown in FIG. 4*a* as waveform 69. The resulting currents on switch output lead 71 are plotted in FIG. 4 as respective waveforms 70, 71 alongside the associated input waveforms 68, 69 and threshold potential $V_T$. These currents are connected to the input of the controlled switching stage 75.

Figure 11:
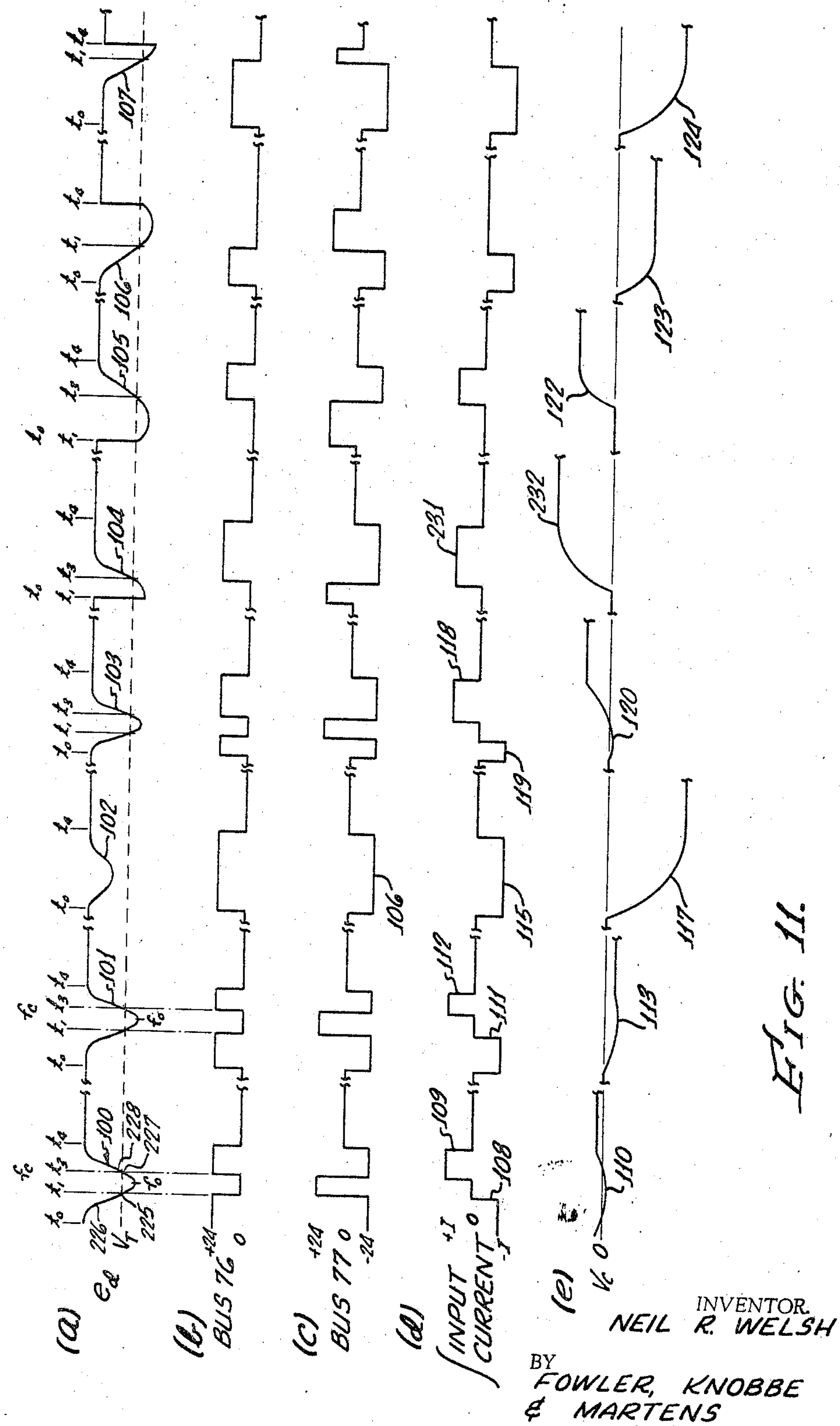
FIGS. 11*a*, *b*, *c*, *d* and *e* illustrate waveforms of the system of FIG. 10 resulting from typical operating conditions in the "waveform track" mode.

Switching stage 75 is connected to a pair of electrical busses **54*a* and 54*b* which are respectively energized during the trace interval by blanking switch 51. As in the foregoing embodiment, the function of stage 75 is to utilize these potentials to energize a pair of output busses 76, 77 in accordance with the current in lead 71. Referring to FIG. 11, the point 225 at which the wave front 226 of the demodulated waveform and threshold potential $V_T$ ar equal in magnitude defines a time $t_1$ and the point 227 at which the wave tail 228 of the demodulated waveform and voltage $V_T$ are equal defines a time $t_3$. During the first time interval of $t_0$–$t_1$ and the second time interval $t_3$–$t_4$ of each trace interval in which the demodulated waveform exceeds in magnitude the potential of the threshold potential, the controlled switching stage 75 responds to the negative current of $i_o$ by supplying +24 volts on bus 76 and —24 volts on buss 77**, as shown in FIGS. 11*b* and 11*c*. Between time $t_1$ and $t_3$, the absence of $i_o$ causes bus 76 to be grounded and bus 77 to be raised to +24 volts. During the blanking intervals between each trace interval, the busses **54*a* and 54*b* are grounded by blanking switch 51, likewise resulting in the grounding of busses 76 and 77**.

The respective first and second time periods $t_0$–$t_1$ and $t_3$–$t_4$ are compared and a control voltage $V_c$ corresponding to a difference therebetween is produced by means of a first constant current source 85, a second constant current source 86 and an electrical integrating circuit 87 coupled thereto. The first current source 85 is responsively coupled to output bus 77 and is energized when this bus is energized with —24 volts, i.e. during the demarcated time intervals $t_0$–$t_1$ and $t_3$–$t_4$. The second current source 86 is responsively connected to output bus 76 and the output of switch 88 and is energized when both switch 88 is ON and output bus 76 is energized with +24 volts. Switch 88 is responsively connected via resistor 230 to bus 77 and is turned ON at time $t_1$ when bus 77 goes to +24 volts. Thus, the second current source 86 is energized only during the second time interval $t_3$–$t_4$ when a demodulated waveform of predetermined amplitude is present on input lead 60 but is not energized during a trace interval wherein the demodulated waveform does not exceed the voltage $V_T$, i.e. a trace interval in which time $t_1$ is absent.

As in the previous embodiment, the integrator 87 integrates the current supplied by the current sources 85 and 86 to provide a control voltage $V_c$ at the output amplifier 91. Likewise the search reset switch 95 responds to a preset voltage level and drives the integrator over output lead **96*b*** until its voltage is changed to a preset level such that the sweep generator oscillator is driven to its minimum output frequency.

The circuitry shown in block form in FIG. 10 may be implemented using the same elements within the blocks as shown in FIG. 8. Thus, the +24 volts applied to bus 77 at time $t_1$ serve to fire the SCR 176.

A further understanding of the operation of the automatic tracking stage shown in FIG. 10 and particularly an understanding of the differences between its operation and the embodiment of FIG. 3 may be obtained from FIG. 11 which illustrates in FIG. 11*a* a series of demodulated waveforms resulting from changes between the VCO center frequency $f_c$ and the center frequency $f_o$ of the device under test. FIGS. 11*b* and 11*c* illustrate the resulting waveforms applied to the busses 76 and 77 and waveform **11*d* illustrates the resulting current supplied to the integrator 87** for the several demodulated waveforms. FIG. 11*e* illustrates the resultant control voltage.

Demodulated waveform 100 in FIG. 11*a* illustrates the case in which the frequencies $f_c$ and $f_o$ are the same. Accordingly, the times $t_0$–$t_1$ and $t_3$–$t_4$ are identical; therefore, equivalent magnitudes of current are taken from the integrator during the first time interval as shown at 108 and delivered to the integrator during the second time interval at 109 in FIG. 11*d*. As a result, the control voltage $V_c$ remains essentially the same during this trace interval as shown in FIG. 11*e* at 110 and likewise the center frequency of the oscillator remains essentially constant.

The next succeeding demodulated waveform 101 has a center frequency $f_o$ somewhat higher than the VCO center frequency $f_c$ so that its crest is displaced toward time $t_4$. As a result, the first time interval $t_0$–$t_1$ is substantially longer than the second time interval $t_3$–$t_4$. As a result, a greater magnitude of current is taken from the integrator during the first time interval as shown at 111 than is supplied thereto during the second time interval as shown at 112. As a result, the voltage level $V_c$ falls during this trace interval as shown at 113 causing a corresponding rise in the center frequency of the sweep generator oscillator 27.

Demodulated waveform 102 illustrates the operation of the system when the demodulated waveform is of insufficient amplitude to cross the threshold level $V_T$. During such a trace interval, times $t_1$ and $t_3$ are therefore absent. Accordingly, the bus 76 remains at +24 volts and the bus 77 remains at —24 volts during the entire trace interval. Accordingly, a current of —*I* is withdrawn from the integrator during the entire trace interval as shown at 115. This produces a falling voltage $V_c$ as indicated at 117 and a corresponding increase in the center frequency of the VCO 127. The center frequency will continue to increase until a predetermined voltage $V_c$ is detected by the search reset switch 95 which drives the integrator to a preset level such that the sweep generator will recycle to its minimum output frequency.

Waveform 103 illustrates the demodulated waveform in which the VCO frequency is slightly higher than the center frequency $f_o$ of the network being tested. Accordingly, the first time interval $t_0$–$t_1$ is less than the second time interval $t_3$–$t_4$. As a result, a greater amount of current is delivered to the integrator as shown at 118 than is taken therefrom as shown at 119 and hence, the voltage $V_c$ rises during this time interval as shown at 120 and the frequency of the VCO decreases.

Waveform 104 illustrates the demodulated waveform produced by a tuned circuit whose center frequency is sufficiently lower than the center frequency $f_c$ that only the wave tail is displayed. The first current source 85 remains off until the wave tail intersects the threshold potential at time $t_3$. It then remains energized until $t_4$, the end of the trace interval. The second current source 86 is also energized at time $t_3$ since at that time the bus 76 is raised to +24 volts and switch 88 is ON (having been turned on at time $t_1$ by virtue of bus 77 being raised to +24 volts). Accordingly, an input current of +I is continuously supplied to the integrator during the time interval $t_3$–$t_4$ as shown at 231. As a result, a positive going voltage $P_c$ indicated at 232 is supplied to the VCO resulting in a decrease in the center frequency $f_c$. Accordingly, the VCO is then driven toward the frequency $f_o$ until these two frequencies are equivalent and the demodulated waveform is centered on the oscilloscope display.

Waveform 105 illustrates another case in which the frequency $f_o$ is less than the frequency $f_c$; however, in this example, the difference therebetween is smaller than the previous waveform 104 so that both the wave tail and a portion of the wave front are displayed. As in the foregoing example, both the first and second current sources 85, 86 are turned ON at time $t_3$ so that a net current of +I is delivered to the integrator 77 for the time interval $t_3$–$t_4$ and a positive going voltage $V_c$ shown at 122 is produced at the output of the automatic tracking stage.

Waveforms 106 and 107 illustrate the demodulated waveforms which are displayed when the center frequency $f_o$ of the device under test is somewhat higher than the sweep frequency generator so that only the wave front or a portion thereof and none of the wave tail are displayed. These waveforms turn the first current source 85 ON during the interval between time $t_0$ and time $t_1$ so as to remove a constant current of I from the integrator during this time interval. At time $t_1$, bus 76 returns to ground potential while bus 77 is raised to +24 volts. However, although the switch 88 is then turned ON by the +24 voltage on bus 77, the second current source 86 is not energized because of the ground potential on bus 76. Hence, for both waveforms 106 and 107, the current −I is integrated for a time proportional to the difference between $f_o$ and $f_c$ with resulting proportional control voltage $V_c$ as illustrated at 123 and 124 being fed back to the VCO. This negative going potential increases the frequency $f_c$ so that the demodulated waveform is locked on to the center frequency $f_o$ of the device under test.

Accordingly, it will be seen that the primary difference between the operation of the embodiment of FIG. 3 and the embodiment of FIG. 10 is that the latter embodiment produces a control signal whose polarity is such as to drive the VCO center frequency closer to the center frequency of the device under test whether or not the wave tail falls before or after the center of the trace interval. As a result, the demodulated waveform is continuously tracked in the embodiment of FIG. 10, whereas in the embodiment of FIG. 3, the tracking is momentarily interrupted if the center frequency of the device under test is sufficiently lower than the center frequency of the VCO that time $t_3$ occurs prior to the center of a trace interval (time $t_2$ in FIG. 6).

The embodiment of FIG. 10 also functions in a "marker track" mode by moving switch 67 to its lower position. The operation of this embodiment in this mode is the same as that of the embodiment of FIG. 3 as described above.

I claim:

1. A sweep generator having a center frequency $f_c$ which automatically varies in accordance with the frequency response of circuit means coupled to the output of said sweep generator comprising

- variable oscillator means for supplying to said circuit means a signal which continuously varies in frequency between a first frequency $f_1$ and a second frequency $f_2$ during a trace interval, where $f_c$ is equal to ½ $(f_1+f_2)$;
- means for demodulating the signal output of said circuit means for recovering one-half of the envelope whose contour corresponds to the frequency response of said circuit means over the frequency range between $f_1$ and $f_2$;
- means for providing a common reference amplitude;
- means for obtaining (i) a first time interval between the initiation of said trace interval and a point on the wave front of said demodulated waveform having a predetermined amplitude relationship with said common reference amplitude, and (ii) a second time interval between a point on the wave tail of said demodulated waveform having a predetermined amplitude relationship with said common reference amplitude and the end of said trace interval; and
- means for producing a signal corresponding to the difference between said first and second time intervals and feeding said signal back to said variable oscillator means to automatically vary the center frequency of said variable oscillator means to maintain a predetermined realtionship between said first and second time intervals.

2. A sweep generator whose center frenquency automatically varies in accordance with the frequency response of circuit means under test coupled to the output of said sweep generator comprising

- variable oscillator mean for supplying to said circuit means under test signal which continuously varies in frequency through a frequency range centered at the center frequency,
- means for demodulating the signal output of said circuit means under test and obtaining a demodulated waveform whose contour corresponds to the frequency response of said circuit means under test,
- means for providing a predetermined common reference,
- comparison means responsive to said demodulated waveform and said predetermined common refference for comparing the wave front and the wave tail of said demodulated waveform with said predetermined common reference and producing a signal output corresponding to a comparison of the wave front of said waveform with the wave tail thereof, and
- means for operatively coupling the signal output of said comparison means to said variable oscillator means to automatically vary the center frequency of said variable oscillator means to maintain a predetermined relationship between said wave front and wave tail.

3. A sweep generator whose center frequency $f_c$ automatically varies in accordance with the frequency reof circuit means under test having a predetermined frequency pass band centered at frequency $f_o$ comprising

- variable oscillator means for supplying to said circuit means under test a signal which continuously varies in frequency over a predetermined frequency range centered at the center frenquency $f_c$
- means for demodulating the signal output of said circuit means under test and obtaining a waveform whose contour corresponds to the frequency response of said circuit means,
- means for providing a predetermined common reference,
- comparison means responsive to said demodulated waveform and said predetermined common reference for comparing the wave front and the wave tail of said demodulated waveform with said predetermined common reference and producing a signal output corresponding to a comparison of the wave front of said waveform with the wave tail thereof, and means for operatively coupling the signal output of said comparison means to said variable oscillator means to automatically maintain the center frequency $f_c$ of said variable oscillator means approximately equal to the center frequency $f_o$ of the band pass of said circuit means under test.

4. A sweep generator having a center frequency $f_c$ which automatically varies in accordance with the frequency $f_m$ comprising variable oscillator means for producing a signal during a trace interval which continuously varies in frequency through a frequency range centered at the center frequency $f_c$, means for generating the marker frequency $f_m$;

means for comparing the output signal of said variable oscillator means with said marker frequency $f_m$ and producing a marker pulse when the oscillator signal is equivalent to the marker frequency;

means for obtaining (i) a first time interval between the initiation of said trace interval and said marker pulse, and (ii) a second time interval between said marker pulse and the end of said trace interval; and means for producing a signal corresponding to the difference between said first and second time intervals and feeding said signal back to said variable oscillator means to automatically vary the center frequency of said variable oscillator means to maintain a predetermined relationship between said first and second time intervals.

5. A sweep generator whose center frequency $f_c$ is automatically controlled comprising trace interval means for periodically generating a trace interval;

variable oscillator means responsively coupled to said trace interval means for producing an output signal which continuously varies in frequency between a first frequency $f_1$ and a second frequency $f_2$ during each trace interval, where $f_c$ is equal to ½ $(f_1+f_2)$;

demarcating means responsively coupled to an input signal and to said trace interval means for demarcating during each trace interval a first time interval whose duration corresponds to the location of said input signal with respect to the initiation of the trace interval and a second time interval whose duration corresponds to the location of said input signal with respect to the termination of the trace interval; and means responsive to said demarcating means for producing a control signal corresponding to the difference between said first and second time intervals and feeding said signal back to said variable oscillator means to automatically vary the center frequency of said variable oscillator means to maintain a predetermined relationship between said first and second time intervals.

6. The sweep generator according to claim 5 wherein: the input signal of said demarcating means comprises a waveform whose contour corresponds to the frequency response of a device connected to the signal output of the sweep generator, and wherein said demarcating means compares the amplitude of the wave front and wave tail of said waveform with a predetermined signal level for demarcating said first time interval between the initiation of the trace interval and the point at which the amplitude of the wave front corresponds to said predetermined signal level and said second time interval between the point at which the amplitude of the wave tail corresponds to said predetermined signal level and the end of the trace interval.

7. The sweep generator according to claim 5 wherein: the input signal of said demarcating means comprises a marker pulse, said means demarcating said first time interval between the initiation of the trace interval and the occurrence of said marker pulse and said second time interval between said marker pulse and the end of the trace interval.

8. The sweep generator according to claim 6 wherein: said demarcating means includes a differential amplifier providing a pair of input terminals and an output signal corresponding to the difference between the signals applied to said input terminals, one of said input terminals being connected to said waveform and the other of said input terminals being connected to a variable potential source whose magnitude may be selected to coincide with a predetermined point on the wave front and wave tail of said waveform.

9. The sweep generator according to claim 5 wherein said means for producing a control signal includes:

first and second oppositely poled current sources responsively coupled to said demarcating means, said first current source producing a constant current flow I and said second current source producing a constant flow of current 2I, an electrical integrating circuit, said first current source being connected to said integrator during both of said time intervals and said second current source being connected to said integrator during the said second time interval so that a net current is delivered to the integrator corresponding to the difference between said first and second time intervals, and means responsive to the voltage across said capacitor for providing said feedback control signal.

10. The sweep generator according to claim 9 wherein: said first current source withdraws a current I from the integrator and the second current source supplies a current 2I to the integrator so that when said first source only is connected to said integrator, a current of I is withdrawn therefrom and when both of said current sources are connected to said integrator, a net current of I is delivered to the integrator.

11. The sweep generator according to claim 9 wherein said integrator comprises a capacitor.

12. The sweep generator according to claim 11 wherein a smoothing circuit comprising a series-connected resistor and capicitor is connected in shunt with said integrating capacitor.

13. The sweep generator according to claim 12 comprising:

first and second oppositely poled diodes connected in parallel with said resistor of said smoothing circuit, the voltage across said resistor being below the threshold potential of said diodes when the difference between said first and second time intervals is small, whereas the voltage exceeds the threshold potential of said diodes for larger difference between said first and second time intervals.

14. The sweep generator according to claim 6 wherein said control signal increases for each trace interval causing said center frequency to be varied in one direction during each trace interval when said waveform is not present at the input of said demarcating means.

15. The sweep generator according to claim 14 wherein said means for producing a control signal includes:

first and second oppositely poled constant current sources selectively coupled to an integrating capacitor when said waveform is present at the input of said demarcating means, and means for inhibiting one of said current sources when said waveform is not present so that an increasing potential is produced across said integrating capacitor during each trace interval.

16. The sweep generator according to claim 14 comprising means for resetting said center frequency to the opposite extreme when said variable control signal reaches a predetermined maximum value.

17. The sweep generator according to claim 16 wherein said resetting means includes a controlled rectifier coupled to said integrating capacitor and fired when the voltage across said capacitor reaches said predetermined maximum value.

18. The sweep generator according to claim 7 wherein said means for producing a control signal includes:

first and second current sources, one of said current sources producing a constant current flow I and the second current source producing a constant flow of current 2I, and an electrical integrator, and wherein said means for demarcating said first and second time intervals connect one of said current sources to said integrator at the initiation of the trace interval and connect the second of said current sources to the integrator at the time a marker input pulse is received.

19. The sweep generator according to claim 6 wherein said demarcating means further includes means for producing a pulse at the middle of said trace interval, and wherein said means for producing a control signal includes first and second current sources responsively coupled to said demarcating means, one of said current sources producing a constant current flow I and the second current source producing a constant flow of current 2I, an electrical integrating circuit, said first current source being energized to withdraw a current I from said integrator for a time demarcated by said first and second time intervals and said second current source being enabled by said pulse produced at the middle of the trace interval and energized to supply a current 2I to said integrator for a time demarcated by said second time interval.

20. The sweep generator according to claim 19 comprising:

means for inhibiting said mid-trace pulse when the input waveform fails to exceed said predetermined threshold level during the first half of the trace interval so that said second current source is inhibited from supplying current to said integrating circuit during said second time interval.

21. The sweep generator according to claim 5 wherein said means for producing a control signal includes:

first and second oppositely poled reference sources responsively coupled to said demarcating means, an electrical integrating circuit, said first and second reference sources being selectively connected to said integrating circuit so that a net signal is delivered to the integrating circuit corresponding to the difference between said first and second time intervals, said integrating circuit producing a control signal in accordance with the magnitude of said net signal.

22. The sweep generator according to claim 6, wherein said means for producing a control signal includes:

a switch responsively connected to said demarcating means and enabled whenever said waveform exceeds said predetermined signal amplitude, a first current source producing a constant current flow I responsively coupled to said demarcating means, a second current source producing a constant current flow 2I responsively coupled to said demarcating means and said switch, and an electrical integrating circuit, said first current source being energized to withdraw a current I from said integrator for a time demarcated by said first and second time intervals and said second current source being energized to supply a current 2I to said integrator for a time demarcated by said second interval when said switch is enabled to increase or decrease the center frequency $f_c$ so as to continuously track a demodulated waveform whose amplitude exceeds said predetermined signal amplitude, said first current source being energized to withdraw a current I from said integrator for a time demarcated by said first and second time intervals and said second current source remaining deenergized when said switch has not been previously enabled in the trace interval so as to vary the center frequency $f_c$ in one direction only during each trace interval when the amplitude of said waveform does not exceed said predetermined signal amplitude.

23. The sweep generator according to claim 6, wherein said means for producing a control signal includes:

a switch responsively connected to said demarcating means and enabled whenever said waveform exceeds said predetermined signal amplitude, said means producing said control signal when said switch is enabled to (i) increase or decrease the center frequency $f_c$ so as to continuously track a demodulated waveform whose amplitude exceeds said predetermined signal amplitude, and (ii) vary the center frequency $f_c$ in one direction only during each trace interval when the amplitude of said waveform does not exceed said predetermined signal amplitude.

24. The sweep generator according to claim 6, wherein said means for producing a control signal includes:

enabling means enabled whenever said waveform exceeds said predetermined signal amplitude, a first reference source responsively coupled to said demarcating means, a second reference source oppositely poled to said first reference source responsively coupled to said demarcating means, a second reference source oppositely poled to said first reference source responsively coupled to said demarcating means and said enabling means, and an electrical integrating circuit, said first and second reference sources being selectively connected to said integrating circuit so that a net signal is delivered to the integrating circuit corresponding to the difference between said first and second time intervals when said waveform exceeds said predetermined signal amplitude, said integrating circuit producing a control signal in accordance with the magnitude of said net signal to increase or decrease the center frequency $f_c$ so as to continuously track a demodulated waveform whose amplitude exceeds said predetermined signal amplitude, said first reference source only being selectively connected to said integrating circuit when the amplitude of said demodulated waveform does not exceed said predetermined signal amplitude, said integrating circuit then producing a control signal which varies the center frequency $f_c$ in one direction only.

25. The sweep generator according to claim 5, wherein said means for producing a control signal includes:

means responsively coupled to said demarcating means and enabled at the termination of said first time interval, said means producing said control signal corresponding to the difference between said first and second time intervals for increasing or decreasing the center frequency $f_c$ so as to continuously track a demodulated waveform when said means is enabled, and said means producing a control signal which varies the center frequency $f_c$ in one direction only when said means is not enabled.

26. A system for producing a feedback control signal for automatically controlling the center frequency $f_c$ of a sweep generator comprising trace interval means for periodically generating a trace interval;

variable oscillator means responsively coupled to said trace interval means for producing an output signal which continuously varies in frequency between a first frequency $f_1$ and a second frequency $f_2$ during each trace interval, where $f_c$ is equal to $\frac{1}{2}(f_1+f_2)$;

demarcating means responsively coupled to an input signal and to said trace interval means for demarcating during each trace interval a first time interval whose duration corresponds to the location of said input signal with respect to the initiation of the trace interval and a second time interval whose duration corresponds to the location of said input signal with respect to the termination of the trace interval; and means responsive to said demarcating means for comparing said first and second time intervals and producing a signal corresponding to the difference therebetween, said signal comprising the requisite feedback control signal.

References Cited

UNITED STATES PATENTS

| | | | |
|---|---|---|---|
| 2,560,365 | 7/1951 | Norton | 332—19 X |
| 2,714,663 | 8/1955 | Norton | 324—83 X |
| 2,728,855 | 12/1955 | Norton | 331—3 |

RUDOLPH V. ROLINEC, *Primary Examiner.*

E. E. KUBASIEWICZ, *Assistant Examiner.*

U.S. Cl. X.R.

324—82; 331—4; 332—19

UNITED STATES PATENT OFFICE

CERTIFICATE OF CORRECTION

Patent No. 3,427,535 February 11, 1969

Neil R. Welsh

It is certified that error appears in the above identified patent and that said Letters Patent are hereby corrected as shown below:

Column 3, line 9, "track" should read -- trace --. Column 16, line 61, "re-" should read -- response --. Column 17, line 15, after "frequency" insert -- of a marker frequency --. Column 20, lines 38 to 40, cancel "a second reference source oppositely poled to said first reference source responsively coupled to said demarcating means,".

Signed and sealed this 31st day of March 1970.

(SEAL)

Attest:

Edward M. Fletcher, Jr.

Attesting Officer

WILLIAM E. SCHUYLER, JR.

Commissioner of Patents